United States Patent [19]

Lange

[11] 4,451,197
[45] May 29, 1984

[54] OBJECT DETECTION APPARATUS AND METHOD

[75] Inventor: Bradley N. Lange, Chandler, Ariz.

[73] Assignee: Advanced Semiconductor Materials Die Bonding, Inc., Chandler, Ariz.

[21] Appl. No.: 401,936

[22] Filed: Jul. 26, 1982

[51] Int. Cl.³ .............................................. B66C 1/00
[52] U.S. Cl. .................................... 414/737; 250/561; 271/90; 271/103; 271/265; 294/64 R; 414/744 B; 414/752; 414/786
[58] Field of Search ............... 414/729, 730, 733, 734, 414/739, 744 B, 752, 627, 786; 294/64 R; 250/561, 548, 557; 271/90, 103, 265, 176, 258

[56] References Cited

U.S. PATENT DOCUMENTS 3,304,113 2/1967 Hutchison ........................ 294/64 R
3,888,362 6/1975 Fletcher et al. ................ 414/730 X
4,364,707 12/1982 Ott .................................. 414/744 B

*Primary Examiner*—Robert J. Spar
*Assistant Examiner*—Donald W. Underwood

[57] ABSTRACT

This disclosure relates to an object detector which incorporates a photoelectric detector in the vacuum flow path of a vacuum pickup system to serve as a device to determine whether an object has been successfully engaged, retained and transported by a vacuum orifice, so that transport cycles may be modified or terminated by control circuitry in the event that the object has not been successfully engaged, retained and transported, thereby saving time and reducing damage to object, transport means or the surface to which the object is transported.

4 Claims, 3 Drawing Figures

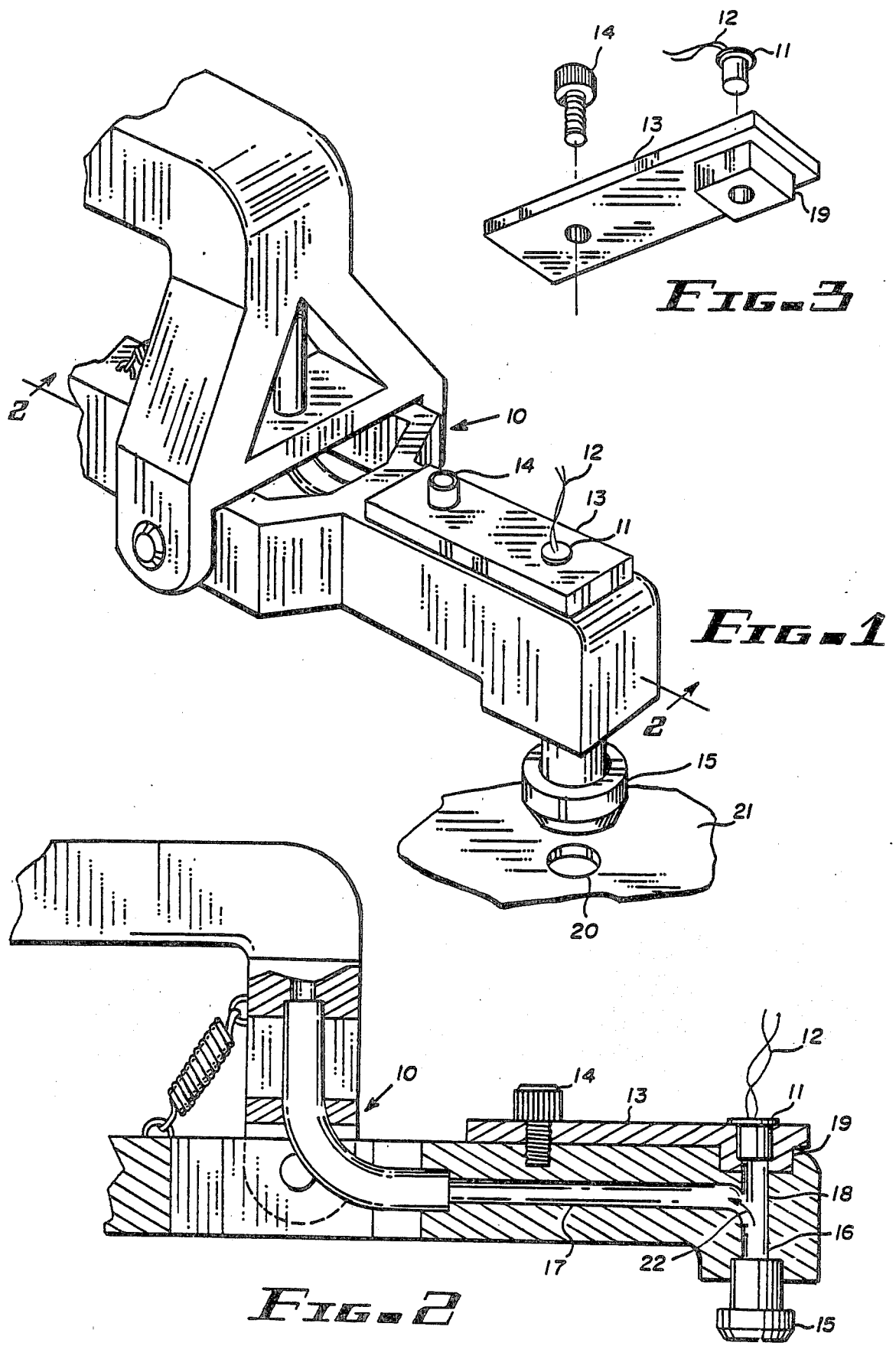

OBJECT DETECTION APPARATUS AND METHOD

BACKGROUND OF THE INVENTION

1. Field of the Invention

This invention relates generally to an apparatus and method for detecting the successful engagement, retention and transport of an object by a transport mechanism, and more specifically, to a high-speed object detection apparatus and method for detecting the successful engagement, retention and transport of a semiconductor chip by a vacuum pickup means of an object transport mechanism useful in the automated manufacture of semiconductor devices.

2. Description of the Prior Art

In the past, semiconductor devices have been batch-processed as adjacent dice on a semiconductor wafer, and, once the wafer has been separated into individual dice, the dice have been picked up and transported by hand-held tweezers, hand-held vacuum pickups, and similar grasping or holding means.

Automatic and semi-automatic pickup and transport apparatus capable of improving semiconductor handling and assembly have been developed to reduce the amount of precision manual labor previously required. Such apparatus is exemplified in co-pending patent application, Ser. No. 147,227, filed May 6, 1980; applicant; James D. Ott; now U.S. Pat. No. 4,364,707; which includes a transport mechanism to convey at least one object from a first reference surface to a second reference surface, and comprises a pickup means having an upper and a lower travel limit for releasably engaging the object, and transport means cooperatively connected to the pickup means for selecting any desired path of travel from the first reference position through an arcuate motion having an independently variable range of elevations equal to the vertical travel limits of the pickup means to the second reference position.

While manual pickup and transport means previously used relied upon the operator's visual observation, usually through a microscope, to verify that engagement, retention and transport was being accomplished, such continuous visual monitoring is undesirable in an automated pickup and transport means such as that described in the application Ser. No. 147,227, now U.S. Pat. No. 4,364,707.

In the event that an automated pickup and transport apparatus is unsuccessful in engaging the desired object, or in retaining engagement via vacuum through the desired transport motion, completion of the transport cycle is unneccessary and wasteful of time.

Orientation of a semiconductor chip is usually important in the proper placement of the chip at the terminus of the transport cycle; however, chips are occasionally retained by a vacuum pickup at an irregular or improper angle, with the vacuum being sufficient to complete the transport, but wherein the release of the improperly oriented chip at end-of-transport cycle onto said second reference position surface could damage the chip, the surface, or the transport means.

Reliable mechanical detection of engaged, retained and transported objects is impractical at the microscopic size and very light weight ranges of typical semiconductor chips. Photoelectric reflectance sensing from side or oblique angles is difficult because of the small size and varying reflectivity of semiconductor chips. Because of the normal variations in vacuum leakage around various chips when grasped, object detection by monitoring vacuum in the line connected to the pickup is similarly difficult.

The need existed to provide a reliable means for detecting successful and proper grasping by a vacuum-pickup object transport mechanism.

SUMMARY OF THE INVENTION

It is an object of this invention to provide an improved object detection apparatus and method for use with an object transport mechanism.

It is another object of this invention to provide an object detection apparatus and method to detect whether an object has been successfully and properly engaged, retained and transported by a pickup means of the object transport mechanism.

It is still another object of this invention to provide an object detection apparatus and method which does not depend upon mechanical detector contact with, optical reflection from, nor blockage of vacuum flow by the object, to detect whether an object has been successfully and properly engaged, retained and transported by a pickup means of the object transport mechanism.

It is yet another object of this invention to provide an object detection apparatus and method to interrupt the transport cycle of the object transport mechanism when successful and proper engagement, retention and transport of the object is not indicated during said cycle, so as to reduce wasted time and motion of the object transport mechanism.

It is yet another object of this invention to provide an object detection apparatus and method to interrupt the transport cycle of the object transport mechanism before an improperly engaged, retained or transported object is released onto a second reference position surface as o s to avoid damage to the object, to the second reference position surface, or to the transport means.

DESCRIPTION OF THE PREFERRED EMBODIMENTS

In accordance with one embodiment of this invention, an object detector is disclosed which comprises a photoelectric light sensor disposed in a vacuum flow path of a vacuum pickup and transport means so as to respond to light entering through a vacuum orifice whereby an object is engaged, retained and transported, wherein incoming light is essentially blocked when the object is successfully and properly engaged, retained and transported, but wherein the sensing of appreciable light produces an electrical output signal signifying absence of successful and proper engagement of the object.

In accordance with a second embodiment of this invention, an object detector is disclosed as in the first embodiment, wherein the light entering the vacuum orifice is ambient light, including light projected upon the transport region by external illumination.

In acordance with a third embodiment of this invention, an object detector is disclosed as in the first embodiment, wherein the transport means is constructed so as to cause the vacuum orifice to pass over one or more discrete sources of illumination, permitting a determination of whether the object has been successfully and properly engaged to be made in the region near each said discrete illumination source location.

In accordance with embodiments 1, 2, and 3, a method is disclosed whereby light is passed into a vacuum orifice, the blockage of which is detected by a photoelectric sensor located in the path of the vacuum flow, and which blockage detection causes an electrical output, the receipt of which causes transport means control logic to interrupt a transport cycle, so as to reduce wasted time and motion in the absence of successful and proper engagement of the object, and to prevent potential damage caused by an end-of-transport-cycle release of an improperly engaged, retained and transported object.

The foregoing and other objects, features and advantages will be apparent from the following, more particular, description of the preferred embodiments of the invention, as illustrated in the accompanying drawings.

Referring to FIG. 1, a perspective view is shown of a vacuum pickup transport means 10 as exemplified in patent applicaton Ser. No. 147,227, now U.S. Pat. No. 4,364,707, wherein orifice means 15 is employed to engage, retain and transport small semiconductor dice and the like from a first reference surface 21 to a second reference surface (not shown). Photo detection means 11 is mounted by vacuum-tight plate 13 and retaining screw 14 so as to detect light in the interior of the vacuum path connected to orifice means 15, and to transmit an electrical signal through wiring 12 to logic controlling operation of the vacuum pickup means 10. A translucent opening 20 is provided according to embodiment 3, through which light is transmitted through the orifice to photodetector 11 when said orifice 15 is directly above said translucent opening 20, and is not blocked by the object engaged, retained or transported.

Referring to FIG. 2, a side cutaway view is shown of the vacuum pickup 10, wherein a vacuum chamber 16, 17, 18 is provided to permit vacuum flow from orifice 15 in direction 22, through first vacuum passage 16, and second vacuum passage 17. Photodetector 11 is disposed in vacuum chamber 18 so as to be exposed to light entering vacuum orifice 15 from ambient or discrete light sources (not shown). Photodetector holding plate 13, affixed to vacuum pickup 10 by screw 14, is snugly fitted at flange 19 so as to retain vacuum within vacuum chamber 16, 17, 18.

FIG. 3 is a perspective view of photodector plate 13, showing photodetector 11, connecting wiring 12, retaining screw 14 and vacuum sealing flange 19.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An object detector for detecting the successful engagement, retention and transport of an object by a vacuum orifice comprising:
    a vacuum orifice whereby an object is engaged, retained and transported;
    a vacuum flow path communicating with said vacuum orifice;
    a photoelectric ligh sensor disposed in the vacuum flow path so as to detect light entering the vacuum orifice, and to detect the absence of light when the orifice is blocked by a successfully engaged, retained and transported object.

2. An object detector in accordance with claim 1 wherein the light entering the vacuum orifice is ambient light, including light projected upon the transport region by external illumination.

3. An object detector in accordance with claim 1 wherein the light entering the vacuum orifice is generated by one or more discrete light sources over which the orifice passes during object transport, permitting a determination of whether the object has been successfully and properly engaged to be made in the region near each said discrete illumination source location.

4. A method for detecting the successful engagement, retention and transport of a object by a vacuum orifice comprising the steps of:
    passing light into a vacuum orifice;
    blocking said light by the interposing of a successfully engaged, retained and transported object;
    detecting the light and blockage thereof by a photoelectric detector disposed within the vacuum flow path;
    transmitting an electrical signal according to the detection of said light blockage thereof to electronic control circuitry;
    controlling by means of said circuitry mechanical transport of the vacuum orifice and of the object according to the determination by said electrical signal of whether the object has been successfully engaged, retained and transported.

* * * * *